(12) United States Patent  
Paolino

(10) Patent No.: US 8,142,015 B2  
(45) Date of Patent: Mar. 27, 2012

(54) BABY AND TODDLER SUNGLASSES

(75) Inventor: Lillian R. Paolino, Sands Point, NY (US)

(73) Assignee: Venetian Holdings, LLC., Great Neck, NY (US)

( * ) Notice: Subject to any disclaimer, the term of this patent is extended or adjusted under 35 U.S.C. 154(b) by 0 days.

(21) Appl. No.: 10/695,613

(22) Filed: Oct. 28, 2003

(65) Prior Publication Data

US 2005/0088611 A1 Apr. 28, 2005

(51) Int. Cl.
*G02C 3/00* (2006.01)

(52) U.S. Cl. .................................................. 351/156

(58) Field of Classification Search .................. 351/156, 351/157, 155, 41, 142, 123, 111; 2/10, 426, 2/452, 4; D16/311

See application file for complete search history.

(56) References Cited

U.S. PATENT DOCUMENTS

| | | | | |
|---|---|---|---|---|
| 4,930,885 A | * | 6/1990 | Laschober | 351/156 |
| 4,986,650 A | * | 1/1991 | Wilhelmi | 351/156 |
| 5,042,094 A | * | 8/1991 | Sadowsky | 2/439 |
| 5,406,340 A | * | 4/1995 | Hoff | 351/156 |
| 6,131,209 A | * | 10/2000 | Thayer et al. | 2/452 |
| D466,543 S | * | 12/2002 | Beames | D16/311 |

* cited by examiner

*Primary Examiner* — Hung Dang

(74) *Attorney, Agent, or Firm* — Philip M. Weiss; Weiss & Weiss

(57) ABSTRACT

Baby and toddler sunglasses comprising frames having lenses. The frames are secured around the user's head by a band. The band is secured to the frames by a securing piece.

5 Claims, 4 Drawing Sheets

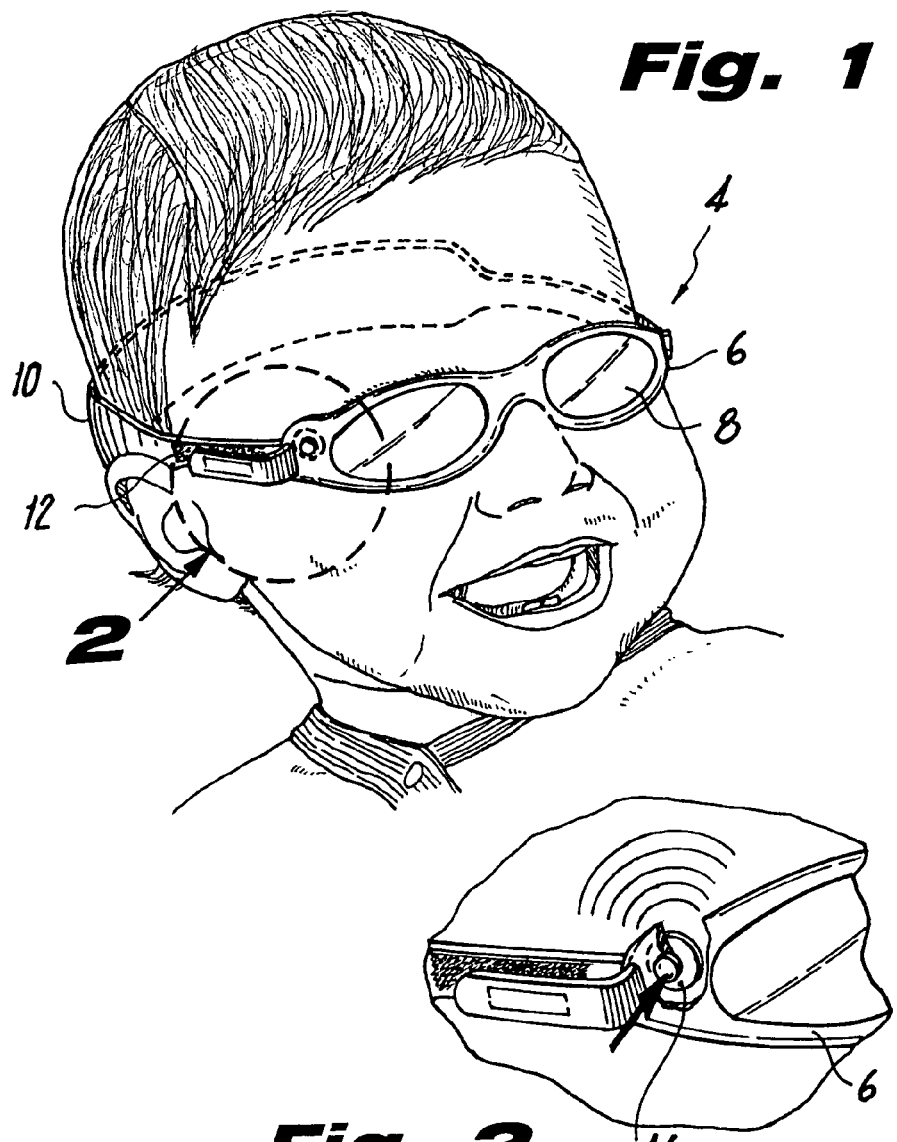
Fig. 1
Fig. 2
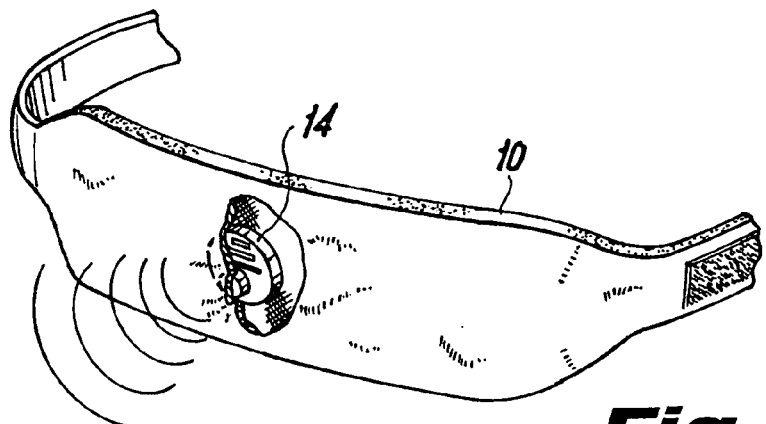
Fig. 3

BABY AND TODDLER SUNGLASSES

FIELD OF THE INVENTION

The present invention relates to baby and toddler sunglasses.

BACKGROUND OF THE INVENTION

Parents try everything to protect their babies and children from the effects of the sun. They are always putting sunscreen on their children, but how do you protect your child's eyes. Babies and toddlers do not want to where sunglasses, and can just remove them after they are placed on the child by the parent.

Eyewear is used for either protective, prosthetic or aesthetic purposes. Eyeglasses consist of a transparent portion encased in a frame that fits around a user's eyes. The transparent portion may be optically inert or include corrective lenses to improve vision. The glasses may be darkened and coated with a radiation filtering film for comfort and protection from sunlight. Frames vary in shape and material.

U.S. Pat. No. 5,771,500 relates to a headband with a lens piece. Incorporated within the headband are a pair of cutouts and a retainer pocket for insertion and retention of a lens piece. The lens piece comprises a pair of eyeglasses with temple pieces removed. A fabric section with a pair of cutouts is attached to the bottom edge of the headband forming the retainer pocket. The headband encircles the head of the wearer and fastens adjustably with releasably cooperating fastener.

U.S. Pat. Nos. D466,543, D432,556, D178,328 and D450,744 relate to different designs for eyewear, sunglasses and eye goggles.

U.S. Pat. No. 2,110,332 relates to a facial protective device. The device is arranged to engage against the face of the wearer and particularly the portions across under the eyes, is a perspiration-absorbent pad, i.e., a sheet having openings for vision and adapted to lie under the goggle cups.

U.S. Pat. No. 5,042,094 relates to eyewear with prosthetic parts for small children. A rigid shatterproof lens portion is encased in a padded and pliable frame that is strapped around the baby's head. Nose and temple pieces are incorporated into the frame to provide support for the frame on the baby's face in the absence of the normally supportive bone structure of adults.

U.S. Pat. No. 5,268,710 relates to sunglasses for infants and small children formed of a lens-defining member made of a thin flexible light-transmitting plastic material of a sun-protective composition or color. The lens-defining member has opposite projecting tabs to which flexible extendable strips are attached for supporting the sunglasses on the head of the wearer. A frame made of a soft flexible plastic foam material and having two superimposed frame members of substantially the same shape is formed by affixing each frame member to a respective face of the lens member.

U.S. Pat. No. 5,718,002 relates to a eye and ear protective eyewear comprising a standard pair of conventional reading glasses, prescription glasses, safety glasses or sunglasses to which a pair of wind deflecting deflectors are attached to the lenses and/or frame and extend rearward from the lenses towards the ear. The deflectors are configured and arranged to deflect air flow away from the ear.

U.S. Pat. No. 5,274,847 relates to a device to protect the wearer's nose from sunlight, to be attached to glasses or goggles. The device is constructed from a single piece of flexible, creasable sheet material, and has a nose shield and a strap extending from the top of the nose shield. The strap is looped over the bridge of the eyewear and threaded through an aperture at the top of the nose shield.

U.S. Pat. No. 5,339,119 relates to an eye protection device comprising a foam rubber-like resilient insert member. There are apertures in the device for receipt of the lenses and frame of a pair of eyeglasses.

U.S. Pat. No. 5,184,156 relates to glasses with color switchable multi-layered lenses. The glasses are for blocking harmful radiation and include a rim connected to temples. The rim contains a photosensor, a color-changing switch, a dry cell power source, solar cells and an electronic driver unit and an electronic circuit. The color-switchable lenses comprise glass plates, and conductive layers and color polarizers, alignment layers, a neutral polarizer, and liquid crystal layers.

U.S. Pat. No. 5,483,303 relates to spectacles having adjustable temples and ear engaging members. The spectacles can be adjusted to accommodate the size and contour requirements of any wearer and includes an eye shield attached to an eye shield frame. The eye shield frame has a groove for receiving a coin or similar object which is used to forcibly dislodge the shield from the shield frame to allow for replacement of the shield.

U.S. Pat. No. 5,541,677 relates to spectacles having a retaining strap with connect earplugs. The device includes an eyeglass retainer for holding eyeglasses on the user's head or around the neck, and earplugs connected to the retainer for protecting the user's hearing.

U.S. Pat. No. 4,715,702 relates to a structure for providing a decorative pattern over the surface of sunglasses, the structure combining a positive decorative pattern on a first layer, a reflective layer, and a third layer incorporating a negative decorative pattern. The decorative pattern is readily apparent to an observer, but the negative pattern cancels the image for the wearer who then sees only a uniform color or hue that does not interfere with the vision of the user.

U.S. Pat. No. 5,359,370 relates to multi-component eyewear. Its features include a 180 degree reflex spring hinge, a sway hinge mechanism that allows the temples to be independently adjusted to improve comfort and fit of the eyewear behind the ears, a strap-pad designed to fit different shaped and sized noses and be positioned for wearer comfort. The device further comprises a frame and lens construction that allows for modularity by the easy removal and replacement of the lens, temples, tops of frames, and nose pieces; and accessories that can be added to the eyewear to provide a greater degree of comfort and to protect the face from ultraviolet radiation and the wind.

U.S. Pat. No. 5,652,635 relates decorative eyeglasses having a lens-carrying frame and temple pieces mounted to the lens carrying frame, the temple pieces including a temple block hinged to the frame, ear pieces, and, between the block and the ear pieces, a segment mounted on the hinge block, but rotatably mounted with respect to the frame. The rotatable section can be made in various shapes, or imprinted with various different decorations on different sides, or made vari-colored.

U.S. Pat. No. 5,528,320 relates to protective eyewear having a unitary brow bar with temples and flexible molded hinges. The temples may be adjusted in length. The frame includes integrally molded flexible hinges which allow the temples to collapse. A unitary spherical lens is selectively attached to the frame and can be adapted to wrap around the forehead of the user's temples and include a nose bridge for supporting the lens on the user's nose. A stabilizing strip may be used to hold the frame and lens in place when the eyewear is assembled.

U.S. Pat. No. 6,481,846 relates to a headset and eyewear combination comprising a headset adapted to cover the ears of a user and having a portion of a fastener on the exterior surface of the headset. Eyewear is selectively secured to the exterior portion of the headset with a complimentary portion of the fastener. The eyewear is maintained over the face of the user by means of flexible temples.

U.S. Pat. No. 5,712,697 relates to a pliable sun shield accessory for eyeglasses which includes a pliable elongated tubular member which is formed with a longitudinal slit. The slit allows the elongated tubular member to be splayed apart for positioning over the top portion of the eyeglasses.

U.S. Pat. No. 6,023,372 relates to a light weight, compact remountable electronic display device for eyeglasses or other eye frames. The device attaches to eyewear having a dead-borne frame to provide an image from an image display superposed on the ambient image. The display device has a housing which removably mounts to the head-borne frame at a location outside of a user's field of view. An electronic imaging assembly is supported by the housing assembly outside of the user's field of view and in communication with circuitry within the housing assembly to produce an image. An optical element is provided comprising a transparent fixture supporting an eyepiece assembly in front of a user's eye. The transparent fixture is located to receive the image from the electronic imaging assembly and relays the image to the eyepiece assembly, which directs the image to the user's eye.

U.S. Pat. No. 6,062,689 relates to a mechanism for protecting the eyes from the sun that allows a user's temples and face to be exposed completely to the sun by providing a mechanism that includes a sunshield, having a sun-protection factor, an arm attached to a stationary object for selectively positioning and maintaining the sun-shield in front of the eyes, and a mechanism for varying the sun protection factor.

U.S. Pat. No. 6,481,059 relates to hat fasteners for eyeglasses. The invention relates to safety glass holders and eyeglass holders for securing to hats or fabric comprising a wedge shaped design, a clip on design and a fastening design. The fastening design comprises a frame secured to the insides of a hat, first and second elastic cord or pin penetrating the hat and secured to the frame, and a strip disposed between the first and second elastic cords or pins for holding the arm of a pair of safety glasses.

U.S. Pat. No. 6,340,227 relates to an earplug system for storing and dispensing earplugs to an individual. The earplug system includes a connector formed for removably connecting to the distal ends of the arms of glasses, a recoil device attached to the connector, a length of cord stored within and dispensed from the recoil device, and an earplug attached to the cord.

U.S. Pat. No. 6,010,216 relates to a hear speak two-way voice radio communications eyeglasses. The eyeglasses include a radio receiver, a radio transmitter, power supply, antenna and earphones. The receiver, transmitter, power supply, and antenna are within the bow pieces.

U.S. Pat. No. 6,349,001 relates to an eyeglass interface system which integrates interface systems within eyewear. The system includes a display assembly and one or more audio and/or video assemblies mounted to an eyeglass frame. The display assembly is mounted to one temple and provides an image which can be viewed by the user. The audio or video assembly is mounted to the other temple and is in communication with the display assembly. The system may comprise a camera assembly, and/or an audio input or output assembly, such as a microphone and/or speakers. A head tracking assembly may be provided to track the position of the user's head. The system can comprise a telephone system, pager system or surveillance system.

U.S. Pat. No. 6,301,367 relates to wearable audio system with acoustic modules. The acoustic modules are adapted to be worn on the head of a wearer, such as with a headband, or fastened to a hat or eyeglasses. The modules are situated on opposite sides of the wearer's head, adjacent the ears, and each contains a transducer, an outlet port, and a vent port. The audio system is connected to, or in communication with, a conventional source of audio signals, such as radio, tape player, CD player, cellular telephone, or the like.

SUMMARY OF THE INVENTION

The present invention relates to baby and toddler sunglasses. It is an object of the present invention for the sunglasses to have a band which can be adjusted to fit different sized heads. It is an object of the present invention for the sunglasses to have a single Velcro strap which closes the glasses around the user's head. It is an object of the present invention for the strap to be removable from the frames and interchangeable with other straps. It is an object of the present invention for the strap to be attached to the frames with two pieces of Velcro at each end of the strap. It is an object of the present invention for the straps to have a loop which fits over a pole, which is attached to the frames. It is an object of the present invention for the bands to be attached to the frames with either Velcro, clips, form fitting, so that the bands can be removed and interchanged with other bands.

It is an object of the present invention for the frames to include a sound chip. It is an object of the present invention for the band to include a sound chip. It is an object of the present invention for the bands to have lights attached to them. It is an object of the present invention for the frames to have lights attached to them. It is an object of the present invention for the lights to be turned on and off by the user. It is an object of the present invention for the frames to glow in the dark. It is an object of the present invention for the bands to glow in the dark. It is an object of the present invention to provide a covering for the babies or toddler's ears which is attached to the frames or bands. It is an object of the present invention to attach a head piece to the sunglasses.

It is an object of the present invention to add figures to the side of the frames, including flowers, animals, sports items, and cartoon characters. It is an object of the present invention to add rhinestones around the frames. It is an object of the present invention to place a logo on the band or frames. It is an object of the present invention to have the lenses of the glasses be colored. It is an object of the present invention for the lenses to be removable from the frames and interchanged with other lenses. It is an object of the present invention for the color of the lenses to match the color of the band.

BRIEF DESCRIPTION OF THE DRAWINGS

FIG. 1 is a front view showing an embodiment of the sunglasses on the user;

FIG. 2 is a cut out view of FIG. 1 showing a sound chip in the frames of the sunglasses;

FIG. 3 is a back view of an embodiment showing a sound chip in the headband of the sunglasses;

DETAILED DESCRIPTION OF THE INVENTION

Figure 4:
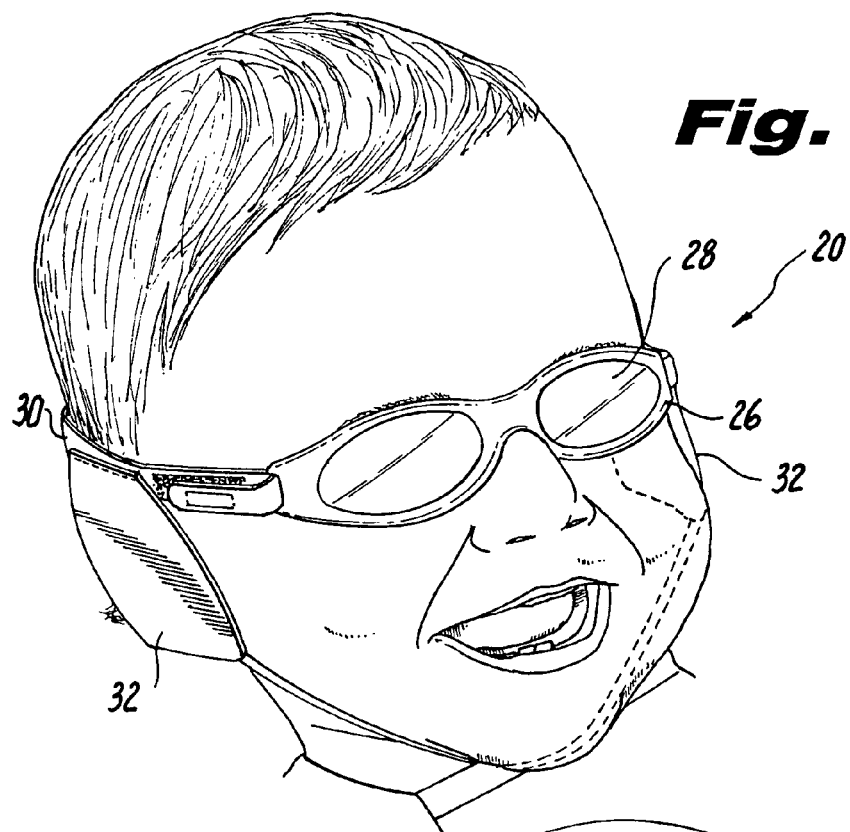
FIG. 4 is a front view showing an embodiment of the sunglasses on the user.

FIG. 1 illustrates an embodiment wherein the sunglasses 4 are placed around the user's head. The sunglasses comprise frames 6 having lenses 8, which are secured around the user's head by band 10. The band 10 is secured to the frames 6 by a securing piece 12. In FIG. 1, Velcro is used as the securing piece. FIG. 2 is a cut out view of FIG. 1 showing sound chip 14 attached to frames 6. In a preferred embodiment the sound chip can be removed and replaced with other sound chips. Each sound chip can be used to play a different children's melody. In a further embodiment, a radio can be placed in the sunglasses. In a further embodiment an ear piece can be attached to the sunglasses so that the sounds can only be heard by the wearer of the sunglasses.

FIG. 3 shows the band 10 of the sunglasses 4. Here, sound chip 14 is placed within band 10. In one embodiment the bands 10 can be removed from the frames 6 and replaced with other bands, which have other sound chips, which play other children's melodies.

FIG. 4 illustrates an embodiment wherein the sunglasses 20 are placed around the users head. The sunglasses comprise frames 26 having lenses 28, which are secured around the users head by band 30. Ear covering 32 is attached to band 30 on each side of the user's head to cover the user's ears.

Figure 5:
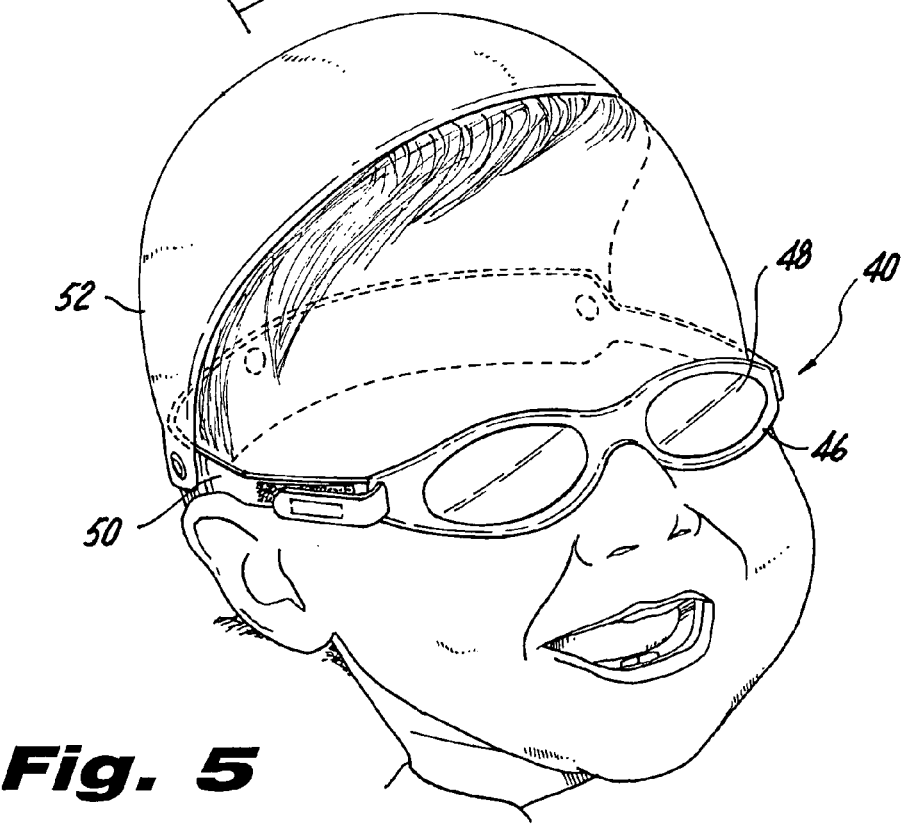
FIG. 5 is a front view showing an embodiment of the sunglasses on the user.

FIG. 5 illustrates an embodiment wherein the sunglasses 40 are placed around the users head. The sunglasses comprise frames 46 having lenses 48, which are secured around the users head by band 50. Headpiece 52 is secured to band 50 and covers the user's head.

Figure 6:
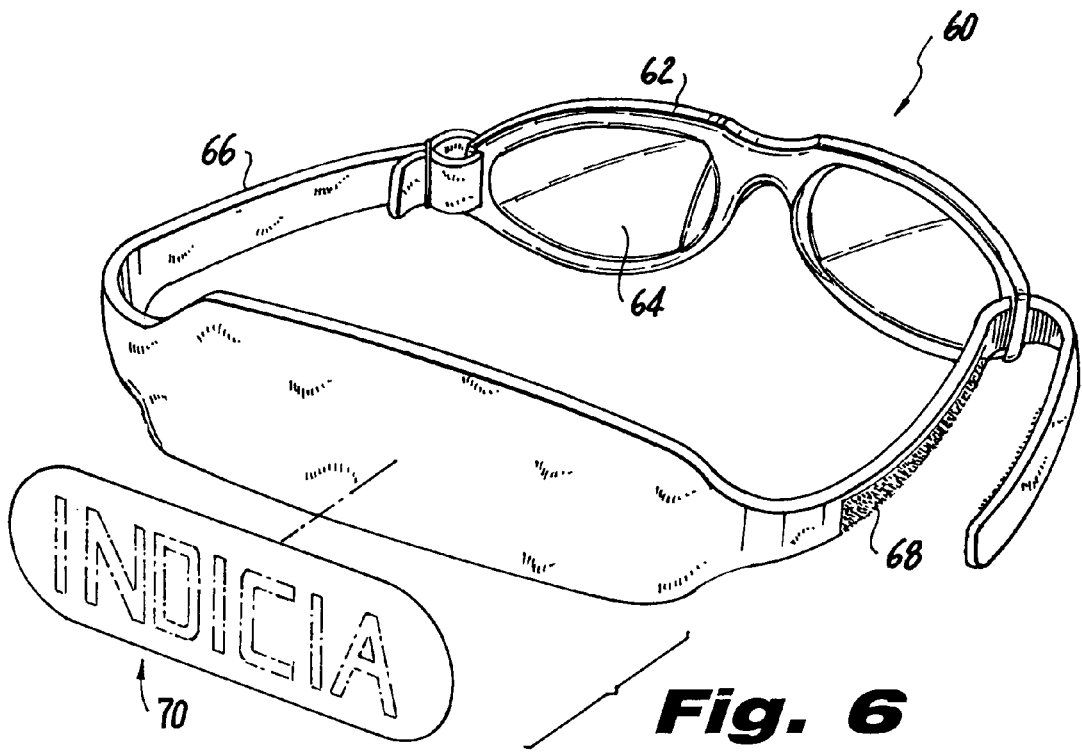
FIG. 6 is a back view of an embodiment of the sunglasses.

FIG. 6 illustrates an embodiment wherein the sunglasses 60 comprise frames 62 having lenses 64, which are secured around the users head by band 66. The band 66 is secured to the frames 62 by a securing piece 68. The securing piece shown in FIG. 6 is Velcro. The securing piece 68 can be adjusted to fit the users head. Stickers and other paraphernalia can be attached to the back of the band 66. This paraphernalia can include names of the user wearing the sunglasses and other embellishments.

Figure 7:
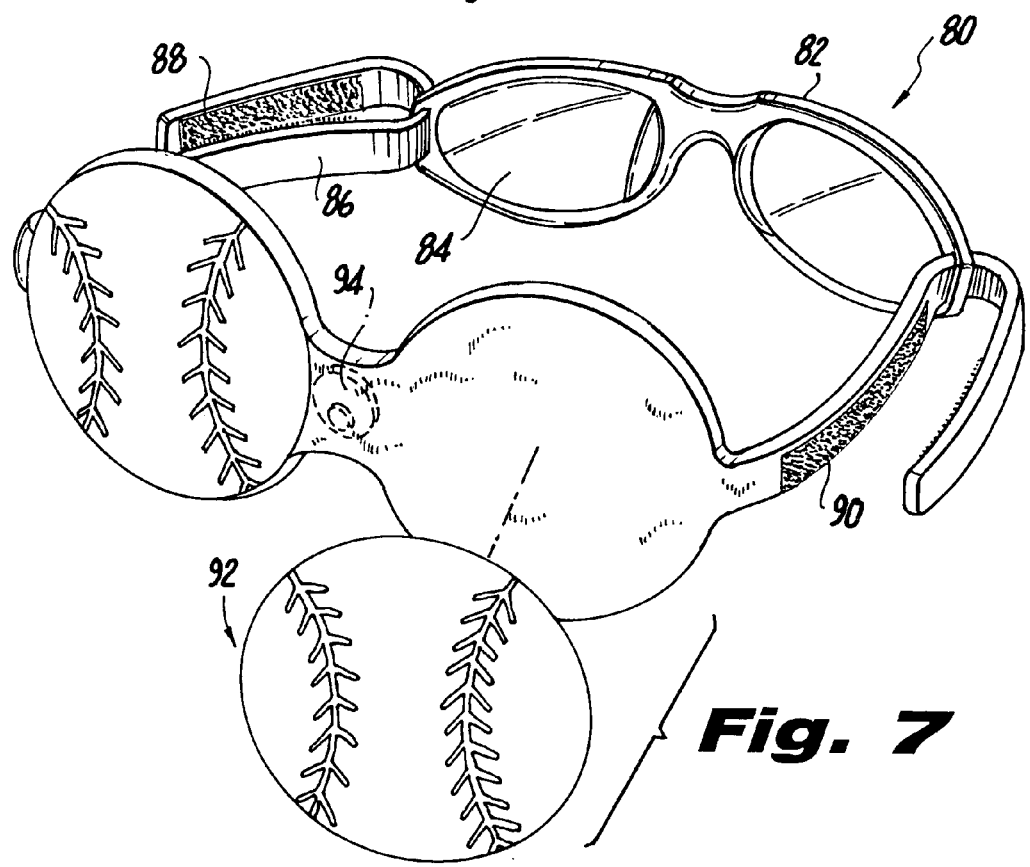
FIG. 7 is a back view of an embodiment of the sunglasses.

FIG. 7 illustrates an embodiment wherein the sunglasses 80 comprise frames 82 having lenses 84, which are secured around the users head by band 86. In this embodiment, band 86 is secured to the frames 82 by securing pieces 88 and 90. In FIG. 7, Velcro is used for both securing pieces 88 and 90. In this embodiment the bands can be totally removed from the frames and replaced with other similar bands. FIG. 7 shows the back of the band comprising the shape of circles. Stickers 92 can be placed on the back of the band. Sound chip 94 is placed inside band 86.

Figure 8:
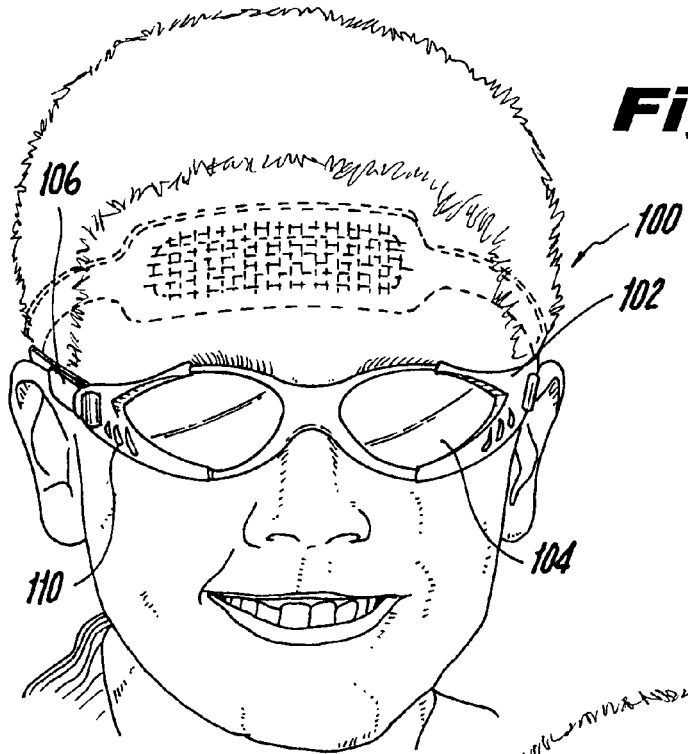
FIG. 8 is a front view showing an embodiment of the sunglasses on the user.
Figure 9:
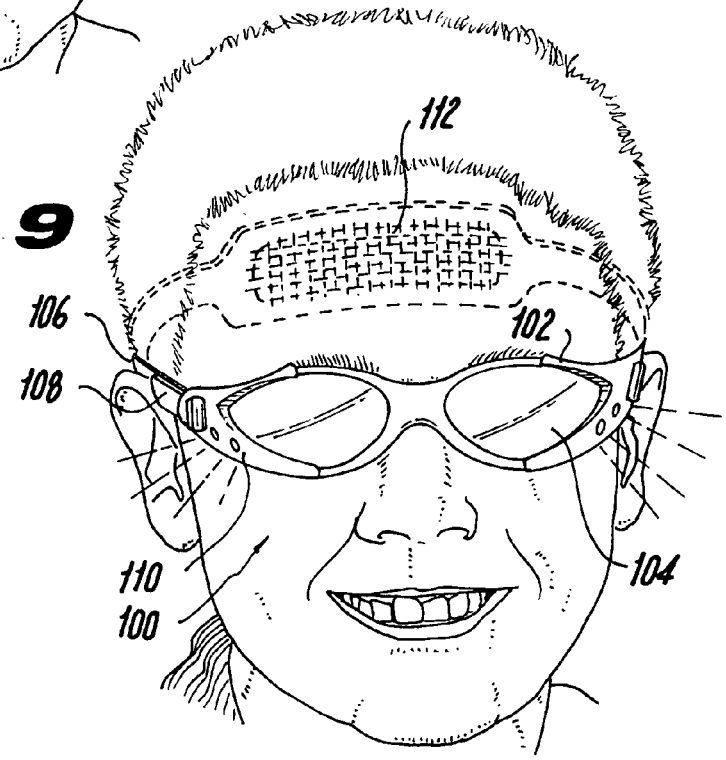
FIG. 9 is a front view showing an embodiment of the sunglasses on the user.

FIGS. 8 and 9 illustrate an embodiment wherein the sunglasses 100 are placed around the users head. The sunglasses comprise frames 102 having lenses 104, which are secured around the users head by band 106. The band 106 is secured to the frames 102 by a securing piece 108. The frames contain lights 110, which are shown in the off position in FIG. 8 and in the on position in FIG. 9. Band 106 comprises a mesh piece 112, which is placed on the back of the users head. The mesh piece assists in providing air to the back of the users head. The mesh piece 112 also assists in providing comfort to the user.

Figure 10:
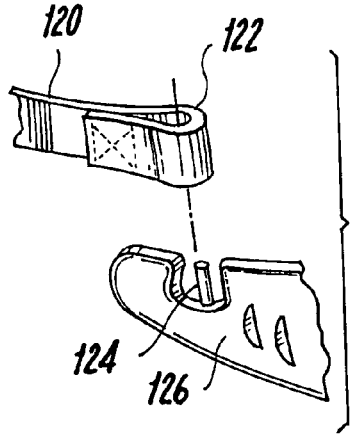
FIG. 10 is a side view showing an embodiment of the attachment mechanism of the sunglasses.

FIG. 10 shows an attachment mechanism of the sunglasses. Band 120 has a loop 122, which fits over a pin 124, which is attached to the frame 126.

The invention claimed is:

1. Baby and toddler sunglasses consisting of:
   solid frames having lenses;
   said frames consisting of a one piece solid molded frame;
   said frames having a nose bridge which fits on top of a users nose;
   said frames secured around a user's head by a single band;
   said band secured directly to said frames by two securing pieces;
   wherein said band is removed from said frame by both of said securing pieces;
   said lenses being colored; and
   said band is adjustable by said securing pieces to fit different size heads.

2. The sunglasses of claim 1 wherein Velcro is used for both securing pieces.

3. The sunglasses of claim 1 wherein said band is totally removed from said frames and replaced with other similar bands.

4. The sunglasses of claim 1 wherein said color lenses match color of said band.

5. The sunglasses of claim 1 wherein said lenses are removable.

* * * * *